(12) United States Patent
Caseau et al.

(10) Patent No.: US 11,259,341 B2
(45) Date of Patent: Feb. 22, 2022

(54) METHOD OF ASSIGNING A COMMUNICATION

(71) Applicant: ORANGE, Issy-les-Moulineaux (FR)

(72) Inventors: Francois Caseau, Chatillon (FR); Florence Faur, Chatillon (FR)

(73) Assignee: ORANGE, Issy-les-Moulineaux (FR)

(*) Notice: Subject to any disclaimer, the term of this patent is extended or adjusted under 35 U.S.C. 154(b) by 0 days.

(21) Appl. No.: 16/146,059

(22) Filed: Sep. 28, 2018

(65) Prior Publication Data

US 2019/0104556 A1 Apr. 4, 2019

(30) Foreign Application Priority Data

Sep. 29, 2017 (FR) ...................................... 1759142

(51) Int. Cl.
*H04W 76/11* (2018.01)
*H04W 12/02* (2009.01)
(Continued)

(52) U.S. Cl.
CPC ............. *H04W 76/11* (2018.02); *G06F 16/27* (2019.01); *H04L 63/0421* (2013.01); *H04W 12/02* (2013.01); *H04W 12/75* (2021.01)

(58) Field of Classification Search
CPC ................. H04W 76/11; H04W 12/02; H04W 12/00518; H04L 63/0421; G06F 16/27
(Continued)

(56) References Cited

U.S. PATENT DOCUMENTS

| 2004/0192252 | A1* | 9/2004 | Aerrabotu | H04M 3/42195 455/404.1 |
|---|---|---|---|---|
| 2009/0034536 | A1* | 2/2009 | Morand | H04L 67/2804 370/400 |

(Continued)

FOREIGN PATENT DOCUMENTS

| EP | 1748634 A2 * | 1/2007 | ........ H04M 3/42008 |
|---|---|---|---|
| EP | 1748634 A2 | 1/2007 | |

(Continued)

OTHER PUBLICATIONS

Fernando, Ruchith, Bharat Bhargava, and Mark Linderman. "Private anonymous messaging." In 2012 IEEE 31st Symposium on Reliable Distributed Systems, pp. 430-435. IEEE, 2012. (Year: 2012).*

(Continued)

*Primary Examiner* — Suraj M Joshi
(74) *Attorney, Agent, or Firm* — David D. Brush; Westman, Champlin & Koehler, P.A.

(57) ABSTRACT

A method of processing data of communications through a communication network. The method includes: receiving first data relating to a first communication between a first and a second electronic device respectively associated with a first and a second connection identifier, the first data including a generic connection identifier associated with the first connection identifier and used for the first communication; storing at least the first connection identifier associated with the generic connection identifier and the second connection identifier used for the first communication; receiving second data relating to a second communication; searching through the second data for the first or the second stored connection identifier; and according to the result of the search, associating the second communication with the first and second connection identifiers.

12 Claims, 8 Drawing Sheets

(51) Int. Cl.
    *G06F 16/27*    (2019.01)
    *H04L 29/06*    (2006.01)
    *H04W 12/75*    (2021.01)

(58) Field of Classification Search
    USPC .......................................... 709/217, 225–227
    See application file for complete search history.

(56) References Cited

U.S. PATENT DOCUMENTS

2009/0131022 A1* 5/2009 Buckley .................. H04L 51/38
                                              455/412.1
2012/0100830 A1* 4/2012 Barber .............. H04M 3/42195
                                              455/410
2013/0115921 A1* 5/2013 Szesztay ........... H04M 3/42008
                                              455/411

FOREIGN PATENT DOCUMENTS

WO        2011001420 A1    1/2011
WO    WO-2011001420 A1 *   1/2011   ........ H04M 3/42008

OTHER PUBLICATIONS

French Search Report and Written Opinion dated Jun. 6, 2018, for corresponding French Application No. 1759142, filed Sep. 29, 2017.
English translation of the French Written Opinion dated Jun. 6, 2018, for corresponding French Application No. 1759142, filed Sep. 29, 2017.

* cited by examiner

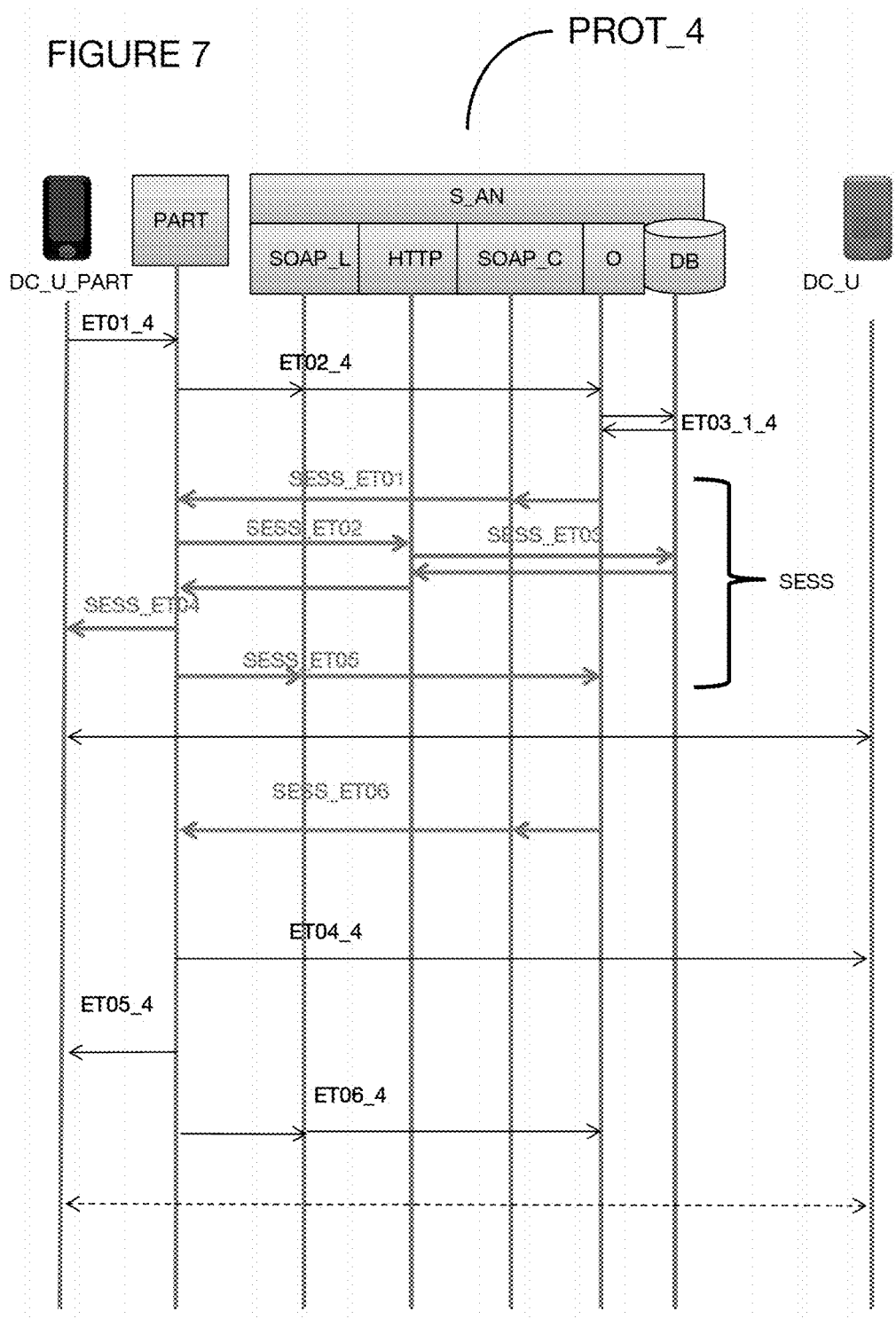

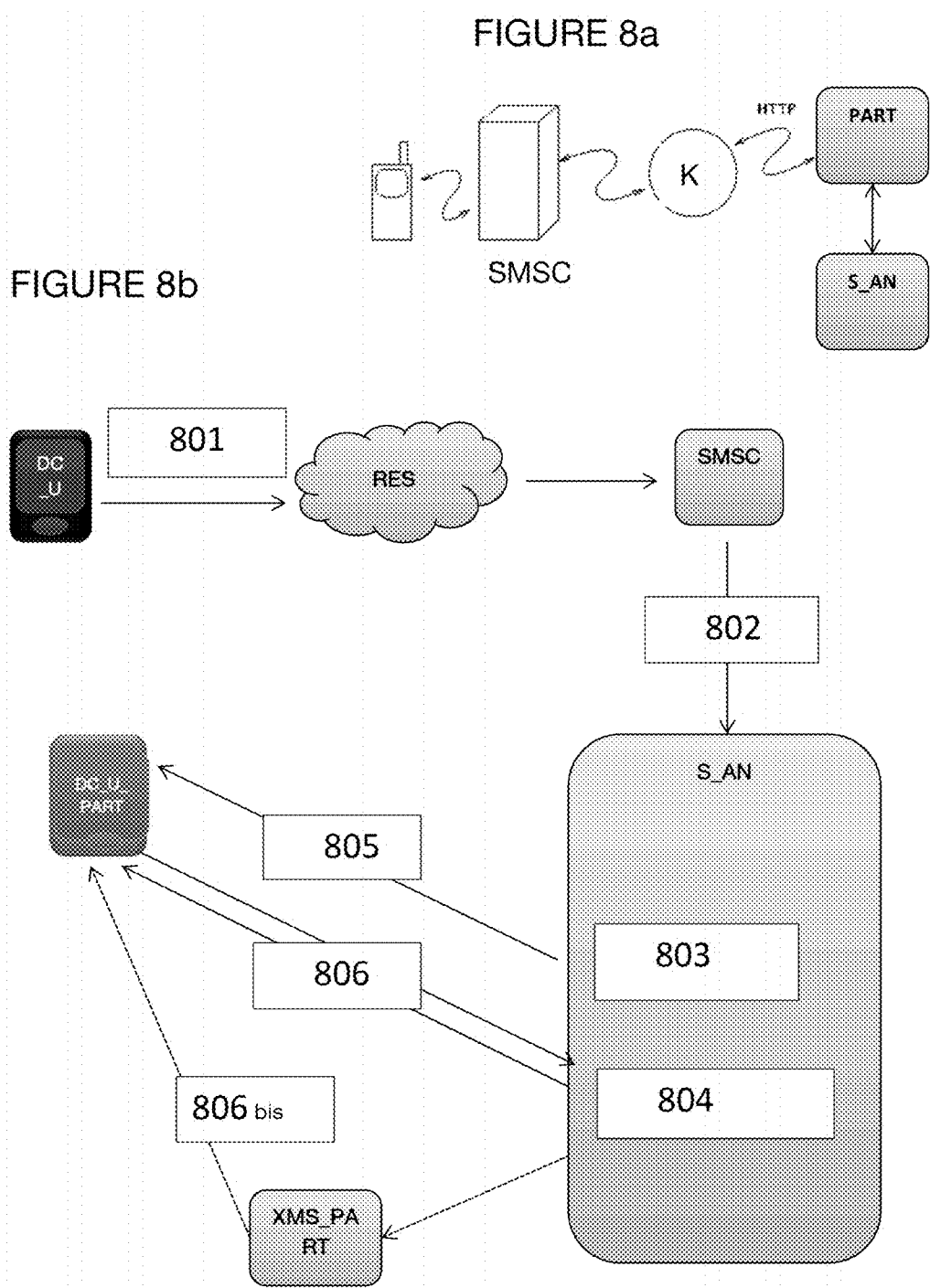

METHOD OF ASSIGNING A COMMUNICATION

CROSS-REFERENCE TO RELATED APPLICATION

This Application claims priority to and the benefit of French Patent Application No. FR 1759142, filed Sep. 29, 2017, the content of which is incorporated herein by reference in its entirety.

FIELD OF THE DISCLOSURE

The present invention relates to the establishment of a communication from a first communication device destined for a second communication device, the first and second communication devices each having in particular a main call identifier. It relates more particularly to communication services that guarantee the anonymity of a user.

BACKGROUND OF THE DISCLOSURE

Communication services that guarantee the anonymity of a user, in particular the calling user, currently propose allocating a secondary call identifier to the terminal of the calling user already having a main call identifier. For example, in the case where the calling user has a mobile communication terminal, the main call identifier is an MSISDN (in English "Mobile Station International Subscriber Directory Number") corresponding in a unique manner to the SIM (in English "Subscriber Identity Module") card which is provided by the operator of the mobile network with which the user is registered. As a general rule, this identifier is the telephone number of the mobile terminal in the said mobile network.

These communication services are for example offered to companies or firms wishing to benefit from alias services. Thus, when a company employee calls his clients via an alias service, it is a secondary call identifier, also called an alias number, that is presented to his clients, and not their main call identifier or "actual" number. Moreover, an alias number may be shared by several of the company's employees, and a company may have several alias numbers.

When a client calls a company's alias number, the actual telephone number of the employee with whom the client will be connected is not disclosed. Alternatively, when an employee calls a client, the call travels via an alias services platform, also called an anonymization platform, which will modify the parameters of calls so as to present an alias number to the client.

However, when the client wishes to call back their previous interlocutor, he possesses only an alias number of the company. Although one of the advantages of the anonymization method allows companies to manage a system for assigning their incoming calls, also called "routing", and/or to not be the target of unwanted callbacks, there are cases of use where the company may choose to preserve a linkup between two interlocutors: a client and one of their employees.

SUMMARY

According to a first functional aspect, there is proposed a method of processing data of communications through a communication network, comprising:
  receiving first data relating to a first communication between a first and a second electronic device respectively associated with a first and a second connection identifier, the first data comprising a generic connection identifier associated with the first connection identifier and used for the first communication,
  storing at least the first connection identifier associated with the generic connection identifier, and the second connection identifier used for the first communication,
  receiving second data relating to a second communication,
  searching through the second data for the first or the second stored connection identifier, and
  according to the result of the search, associating the second communication with the first and second connection identifiers.

The communications data processing method described here allows a company possessing a communication system integrating an alias service to improve the satisfaction of its clients by identifying the latter's previous internal interlocutors so as to redirect an incoming communication directly to one of the previous interlocutors of a client, while safeguarding a major advantage of the alias service: the actual numbers of the company's internal communication devices are not communicated.

Thus, the communications data processing method described here affords the advantage of integrating into a company's communication system (which company may for example be a call centre) new services on the basis of a log of the calls or communications (SMS/messages) so as to assign, if necessary, an incoming call/an incoming communication of a client to an employee previously associated with this client.

Generally, this association between an employee and a client may be established automatically, for example after a call, or manually, for example by an entry in a contacts directory associated with this employee. A manager of the company's telephone system may also associate telephone numbers of clients of the company, with MSISDN identifiers of employees.

According to one embodiment, the first connection identifier is also dispatched according to the result of the search.

Advantageously, this embodiment makes it possible to assign an incoming communication towards a given employee, by transmitting for example to the communication system of the company, the information necessary for this assignment; in particular the employee's "actual" number. By "assign" a communication is meant an information transmission allowing direction/redirection of a communication, or else direction/redirection of a communication in the guise of such through a computerized system.

According to another embodiment, which will be able to be implemented alternatively or cumulatively with that preceding, the first communication is performed to the generic connection identifier.

Advantageously, this embodiment allows a client to be connected directly with the employee with whom he had previously been in contact. An alias number may be either an already existing number, or a number created for the implementation of this invention.

According to one embodiment, which will be able to be implemented alternatively or cumulatively with those preceding, a time period between the first and the second communication is also associated with the second communication according to the result of the search.

Advantageously, this embodiment makes it possible to assign an incoming communication, only in the case where the first communication (for example, the start or the end of the latter) has been performed for less than N minutes (N being parametrizable) before the second communication. Thus, the possibility of callback by a client is limited in time, for example with the aim of safeguarding the employees from unwanted calls.

According to one embodiment, which will be able to be implemented alternatively or cumulatively with those preceding, the generic connection identifier is also stored, searched for, and associated with the second communication according to the result of the search.

Advantageously, this embodiment makes it possible to associate a communication between two interlocutors with a generic connection identifier, so as, for example, to contextualize a log of the communications between these two interlocutors.

According to one embodiment, which will be able to be implemented alternatively or cumulatively with those preceding, a communication type is also stored, searched for, and associated with the second communication according to the result of the search.

Advantageously, this embodiment makes it possible to associate a communication between two interlocutors with a communication type (call or SMS), so as, for example, to suggest to the employee a communication type as communication type preferred by his interlocutor.

According to another embodiment, which will be able to be implemented alternatively or cumulatively with those preceding, the second data relating to the second communication are stored.

Advantageously, this embodiment makes it possible to supply a communications log, in particular that the establishment of this second communication is or is not performed.

According to another embodiment, which will be able to be implemented alternatively or cumulatively with those preceding, if a communication is an established telephone call, data relating to establishment are stored.

Advantageously, this embodiment makes it possible to supply a log of the calls according to the established calls. By establishment of a telephone call is meant actual connection between the sender and the receiver. For example, an employee having responded to one or more calls from a client, the rules of assignment of the communications of the company may limit the number of callbacks of this client to this employee.

According to another embodiment, which will be able to be implemented alternatively or cumulatively with those preceding, if a communication is a non-established telephone call, data relating to non-establishment are stored.

Advantageously, this embodiment makes it possible to supply a log of the calls according to the non-established calls. For example, the employee not having responded to the call or to several calls from a client, the company's communications assignment rules may limit the number of non-established calls so as to apply a redirection of the following calls to a voice messaging facility.

According to another embodiment, which will be able to be implemented alternatively or cumulatively with those preceding, the first communication is performed by an anonymized sender.

Advantageously, this embodiment allows an employee of a company to call a client on the basis of an alias number, and to be called back by the client later without having communicated his actual number.

According to another embodiment, which will be able to be implemented alternatively or cumulatively with those preceding, the second communication is a message.

Advantageously, this embodiment makes it possible to adapt the method described here to a communication type other than the telephone call, for example a communication of SMS type. Thus, a communication's log groups together the connection identifiers arising from telephone calls as well as from messages.

The invention also comprises a computer program able to be implemented on a server for processing communications data comprising code instructions which, when it is executed by a processor, carries out the method of processing communications data.

The invention also comprises a data medium on which at least one series of program code instructions for the execution of the method of processing communications data has been stored.

According to a hardware aspect, there is proposed a server for processing data of communications, able to process data of communications through a communication network, a method of anonymization of connection identifier of electronic devices being implemented through an anonymization platform, the server comprising a database and an application module comprising:

a communication module able to receive and to dispatch data relating to communications between a first and a second electronic device respectively associated with a first and a second connection identifier, a generic connection identifier being associated with the first connection identifier, a storage module able to store in a database, called a communications log, at least the first connection identifier associated with the generic connection identifier of a communication, and the second connection identifier, a search module able to search the database for the stored first or second connection identifier of a communication, and an association module able to associate with a communication, the first and the second connection identifiers.

By integration of the method of the invention, the communications data processing server allows in particular a company to assign to an incoming communication, an internal interlocutor designated according to a communications log.

An operational implementation of the communications data processing server described here is intended to enrich the anonymization platform of a company by providing this company's communication system with new functionalities, in particular for voice services.

BRIEF DESCRIPTION OF THE DRAWINGS

One or more embodiments of the invention will be better understood on reading the description which follows, given by way of example and with reference to the appended drawings in which:

FIG. 7 illustrates by a chart the exchanges performed during step A2 of implementation of the method.

FIG. 8a and FIG. 8b illustrate an environment of implementation of the communications data processing method here presented, for example in the case of an SMS dispatched by a client.

DETAILED DESCRIPTION OF ILLUSTRATIVE EMBODIMENTS

In the description detailed hereinafter in exemplary embodiments of the invention, numerous specific details are presented so as to afford a more complete understanding. Nonetheless, the person skilled in the art may appreciate that embodiments may be put into practice without these specific details. In other cases, well-known characteristics are not described in detail to avoid needlessly complicating the description.

Figure 1:
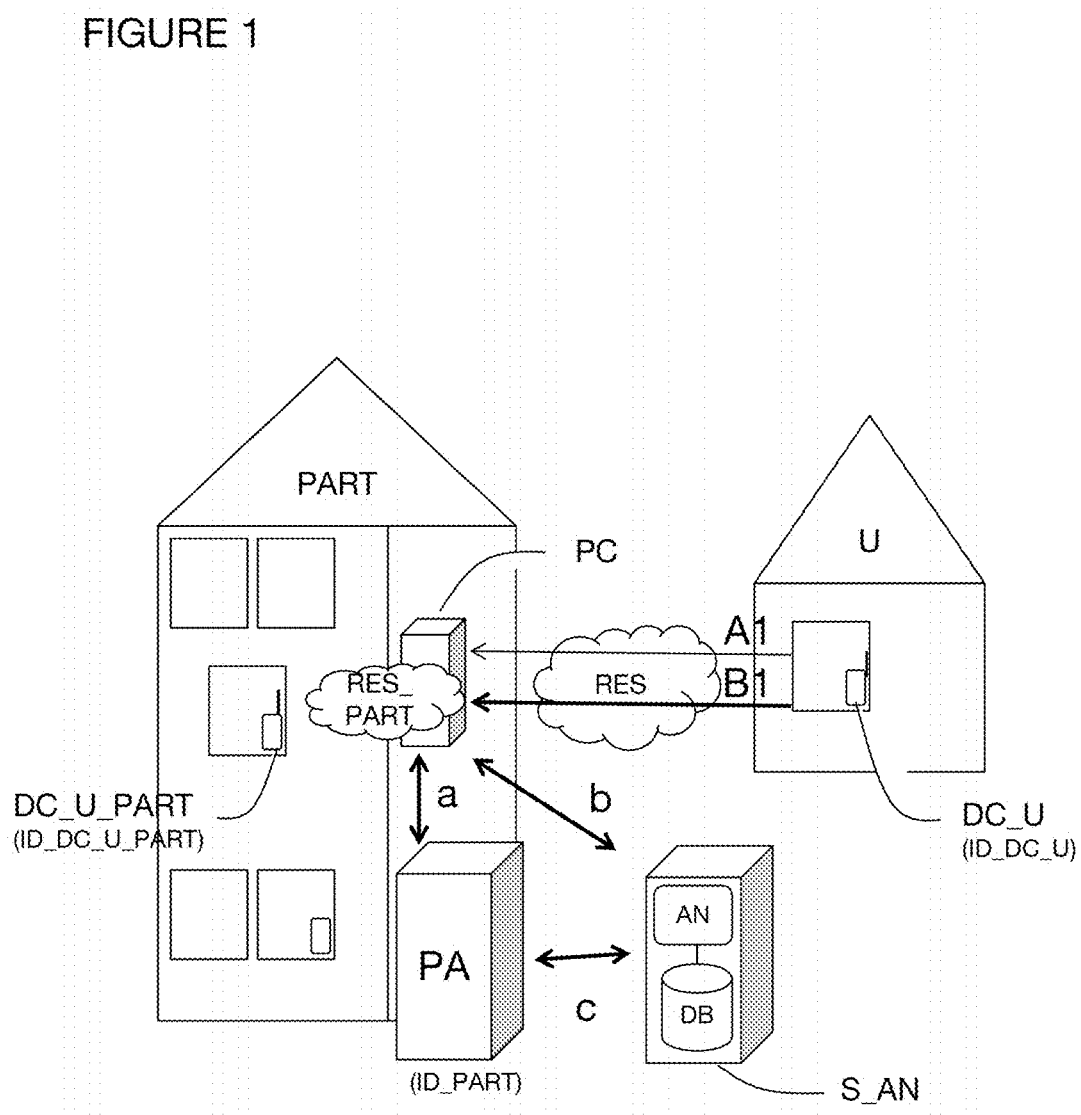
FIG. 1 illustrates a first exemplary implementation of the method here described.

FIG. 1 illustrates a first exemplary implementation of the method here described.

A company PART uses the services of an anonymization platform (also called an alias services platform) and referenced PA, allowing for example an employee of this company to send a call from a telephone device referenced DC_U_PART, to a telephone device of a client U, referenced DC_U. This anonymization platform may be located within a communication architecture of the company, or else be used in SaaS ("Software as a Service" in English) mode by the company.

In one embodiment, the call made by the employee from a fixed telephone of the company, is forwarded to a communication platform, referenced PC, associated with an internal communication network RES_PART of the company. This communication platform interacts with the anonymization platform which anonymizes the connection identifier of the device DC_U_PART by replacing it with a generic connection identifier ID_PART.

Alternatively, if the call is made by the employee from a mobile telephone, the call is forwarded directly from a network, for example an MSISDN network, to the anonymization platform, without passing through a communication network internal to the company.

The establishment of the call continues thereafter to the recipient of the call, the client U identifies the call through the generic connection identifier ID_PART: if the client takes the call, a connection between the employee and the client is performed.

Hereinafter, the connection identifiers associated with the communication devices DC_U_PART and DC_U are referenced respectively ID_DC_U_PART and ID_DC_U.

The method presented here is for example implemented in a server S_AN comprising an application module referenced AN and a database referenced DB, called a communication's (incoming and/or outgoing) log. This server S_AN interacts with the anonymization platform PA. Alternatively, the application module AN is implemented directly within the anonymization platform PA. This server S_AN may be located within a communication architecture of the company, or else be used in SaaS ("Software as a Service" in English) mode by the client company of the invention. Alternatively, an incoming or outgoing call may be forwarded directly from a network, for example an MSISDN network, to the server S_AN.

In one embodiment illustrated by FIG. 1, a client U contacts the company PART by keying in a generic connection identifier of this company, a 4-digit number for example, with the aim of signalling a malfunction of a product or service. In certain cases, this number may have been associated with actual connection identifiers of the company. On receipt of the call via the external communication network RES, the communication platform PC directs the call according to the rules of assignment of the communications defined by the company, for example to an employee in particular. In a particular embodiment, the communication platform PC performs an enquiry beforehand to the alias platform PA (a).

The parameters of the call are saved in a communications log referenced DB, integrated for example into the server S_AN; in particular, the connection identifier ID_DC_U of the sender, the connection identifier ID_DC_U_PART of the recipient, and the time of the call. Alternatively, the alias number used is also stored (c). In a particular embodiment, a step of storing information is performed later once the communication has or has not been established, so as to save this information regarding establishment or non-establishment (b).

In a first step denoted A1, the client U is therefore directed to an employee, the method implemented in the server S_AN stores characteristics of this first call. In a second step B1, the client U calls back a few minutes later, for example to request an additional particular: the communication platform PC recovers the information regarding assignment of the communication from the server S_AN, and the client is directed again to the same employee.

Alternatively, the alias number is also stored during step A1, and then recovered during a step B1. More precisely, during the second step B1, the method receives characteristics of the second call, searches the database DB for the connection identifier of the client U, associates this connection identifier with the first communication, and dispatches the connection identifier of the employee ID_DC_U_PART to the communication platform PC so as to allow the establishment of a call between the devices DC_U and DC_U_PART.

In a particular embodiment, the value of the time period between the first step A1 and the second step B1 makes it possible to track the assignment of the communication towards the device DC_U_PART. For example, if more than an hour has elapsed between the two steps A1 and B1, the method might not dispatch the identifier ID_DC_U_PART to the communication platform PC and/or the alias platform PA, or else dispatch the identifier ID_DC_U_PART with the value of this time period.

In a particular embodiment, the method also searches for the alias number used so as to filter its search; indeed, in the case where the company uses several alias numbers, it may be preferable to integrate this information item with the communications assignment rules.

Figure 2:
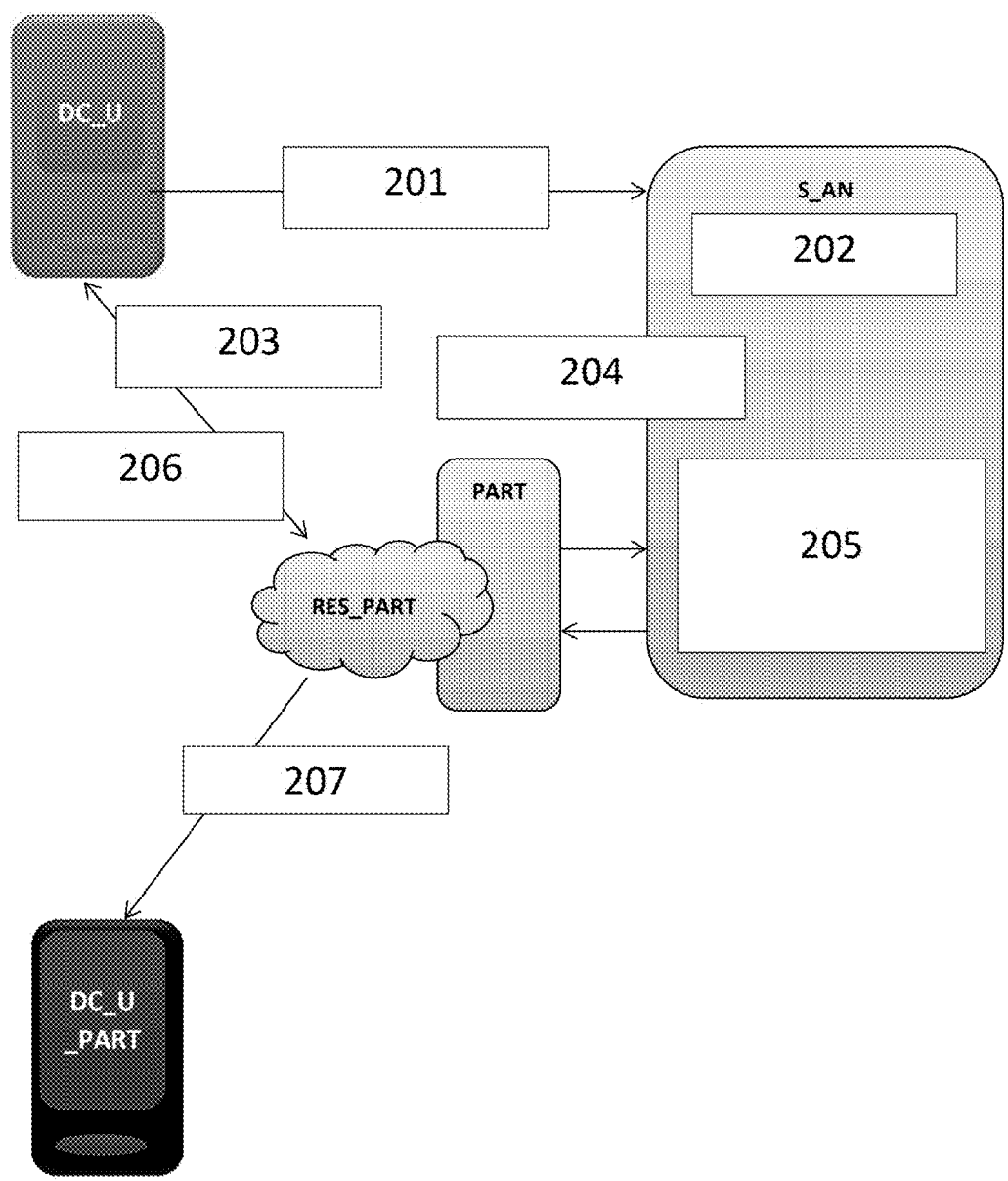
FIG. 2 illustrates the principal steps of implementation of the method during step A1.

FIG. 2 illustrates the main steps of implementation of the method during step A1; these steps are referenced 201 to 207.

The device DC_U connects to the device DC_U_PART via the communication platform of the company PART which uses services of the server S_AN. The following steps are performed in parallel or successively: the sequence of exchanges performed will be detailed in FIG. 3.

At 201 and 202, S_AN receives a notification of initialization of the call of the client U to the company PART and stores data in the log of the calls. At 203, the call is forwarded to the communication platform of the company PART via the company's network RES_PART. The server S_AN is notified of the incoming call in step 204. At 205, the method stores in the log of the calls the connection identifier ID_DC_U and receives the connection identifier IDU_PART of the communication platform of the company PART. At 206, the client U is placed on hold, for example, through a welcome message. At 207, the call is directed to the employee of the company PART, and the communication is established between the two devices DC_U_PART and DC_U. Alternatively, the incoming calls are received directly by the server S_AN, and the application module AN determines the assignment of the call; in particular in the case where an MSISDN network is used.

Figure 3:
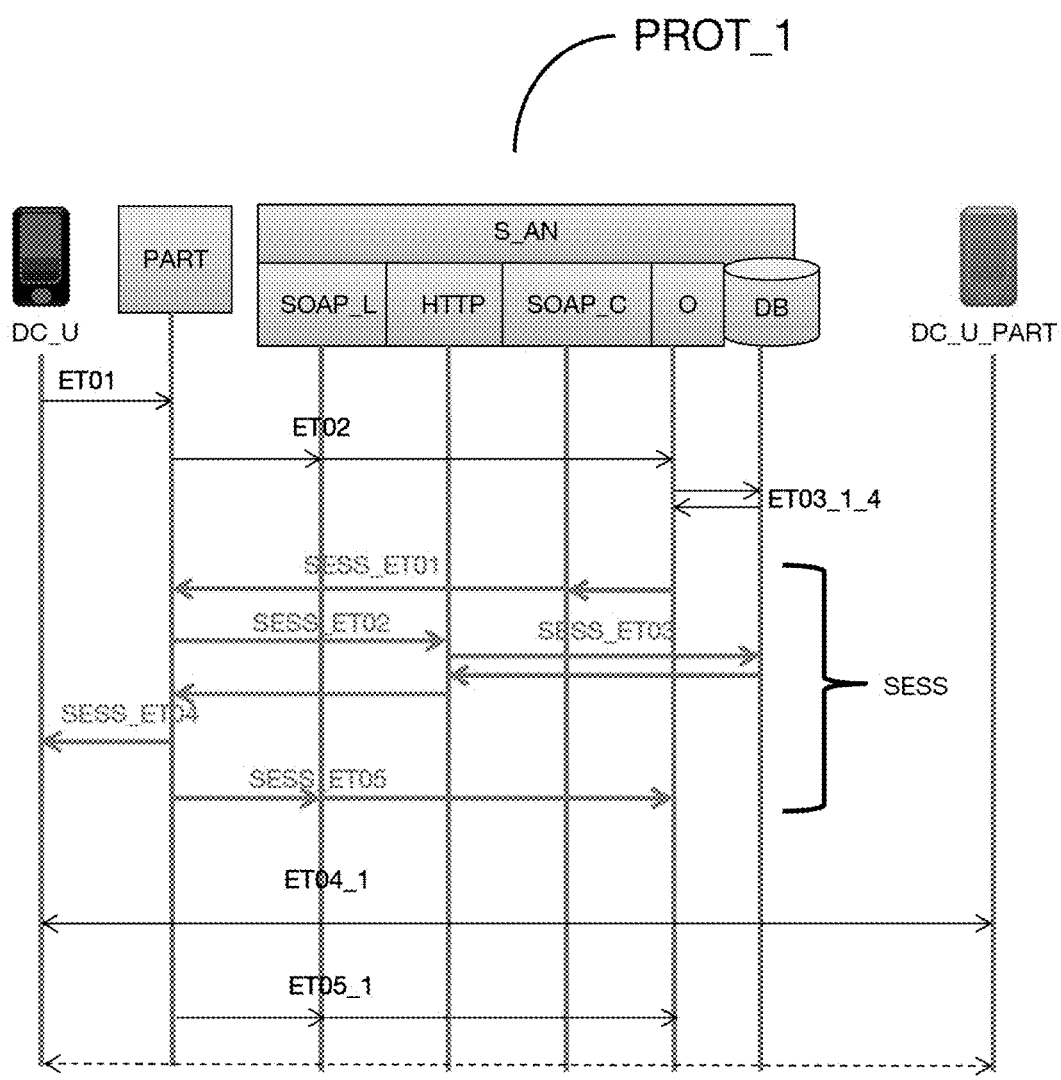
FIG. 3 illustrates by a chart the exchanges performed during step A1 of implementation of the method.

FIG. 3 illustrates by a chart exchanges performed during step A1 of implementation of the method.

In this embodiment illustrated by the scheme PROT_1, the server S_AN implementing the method integrates a communication interface of SOAP (Simple Object Access Protocol) type referenced SOAP_L, an HTTP client application, a client application SOAP_C, a client application O specific to the application module AN, and a database DB. Alternatively, the exchanges may for example be executed according to an architecture of REST ("Representational State Transfer" in English) type.

When an incoming call arrives at the company PART during a step ET01, the communication interface SOAP_L and the client application O receive the notification of this incoming call in a step ET02. In a step ET03_1_4, the client application O guides the storage of the connection identifier of the incoming call in the database DB. Alternatively, the time of the call and the alias number used are also stored.

In a step ET04_1, the client U is directed to an employee of the company PART.

In a step ET05_1, the server S_AN receives the information about the establishment of the call. The devices DC_U and DC_U_PART are connected.

A set of steps (referenced SESS_ET01 to SESS_ET05) of a session referenced SESS are carried out between ET03_1_4 and ET04_1 and describe a series of dispatches of information and of enquiries between the internal communication platform PC and the alias services platform PA, with the server S_AN, thus allowing updating of the information between the communication platform of the company PART and the service S_AN. Hereinafter, the platform PC, the platform PA, or the set grouping together the two platforms PC and PA, are interchangeably called the platform of the company PART.

More precisely, a "push" notification is performed through SESS_ET01 from the client application O to the platform of the company PART and the client application SOAP_C, an enquiry SESS_ET02 is launched by the platform of the company towards the HTTP client to obtain the language used for the enquiries in respect of the voice (VXML) and thereafter to transfer a voice message to the device DC_U by SESS_ET04. An enquiry SESS_ET03 is launched by the HTTP client towards the database DB to store or recover information, a push notification is performed through SESS_ET05 so that the server S_AN is notified of the information updated by the platform of the company PART. Hereinafter, the above steps are referenced by SESS, and will not be recalled.

The enquiries to the database DB are performed as a function of the service and/or of the context. These enquiries may be the number of calls received over a time period, the number of calls performed over a time period, the mean time of the calls received over a time period, the mean time of the calls performed over a time period, the number of distinct contacts for the incoming calls over a time period, the number of valid contexts over a time period, the time of valid contexts over a time period, etc.

In an industrial application of a service implementing the method here described, the association between an alias number ID_PART and an actual number of an employee ID_DC_U_PART relating to the electronic device DC_U_PART is called a "context": in an exemplary implementation, the method obtains the log of the calls for a given alias number through the enquiry GET/contexts/{contextId}/calls.

In a particular embodiment, a connection identifier may be associated with a whitelist, for example only if it is a valid telephone number, if the prefix of the country is accepted by the service ("aliasing countries whitelist" in English), and if it is not an alias number. Likewise, a connection identifier may be associated with a list of preferred contacts, for example associated also with a given alias number.

Figure 4:
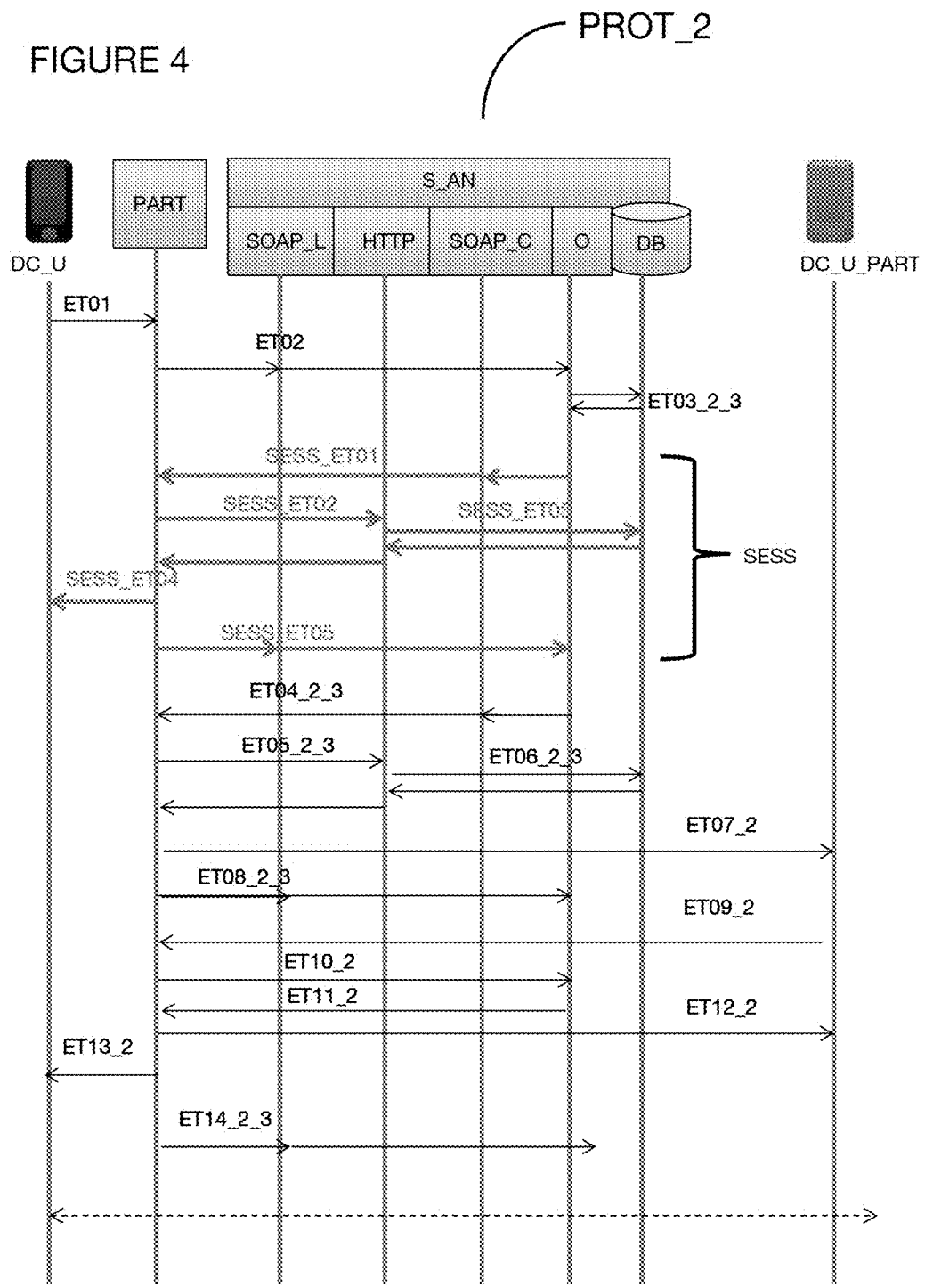
FIG. 4 illustrates by a chart the exchanges performed during step B1 of implementation of the method in case of establishment of a communication.

FIG. 4 illustrates by a chart the exchanges performed during step B1 of implementation of the method in case of establishment of a communication.

In one embodiment illustrated by the scheme PROT_2, the employee will consent to take the call of the client U during step B1.

Recall that steps SESS_ET01 to SESS_ET05 of the set SESS are identical to the scheme PROT_1 of FIG. 3.

In a step ET03_2_3, the client application O recovers from the communications log, the connection identifier of the recipient of the call. The client application O calls the communication platform of the company PART so as to perform a confirmation protocol through the HTTP client of the server S_AN: a push notification ET04_2_3, an enquiry ET05_2_3 to the HTTP client, and then an enquiry ET06_2_3 by the HTTP client.

In a step ET07_2, the employee called receives a notification of the call, and the information item relating to this notification in a step ET08_2_3, among other things by the client application O of the server S_AN.

In a step ET09_2, the employee accepts the call for example by pressing the "*" key of the telephone, and the communication platform of the company dispatches the information item relating to this acceptance in a step ET10_2 to the client application O of the server S_AN. In a step ET11_2, the establishment of a communication with the employee is requested of the platform of the company by the client application O; which the former performs by dispatching a push notification ET12_2 to the device DC_U_PART. In a step ET13_2, the client is notified of the connection, and in a step ET14_2_3 the server S_AN receives the information of this notification. The two communication devices are connected.

The above steps describe a series of dispatches of information and of enquiries between the communication platform of the company and the server implementing the method here described, allowing an update of the information between the communication platform of the company PART and the server S_AN.

Figure 5:
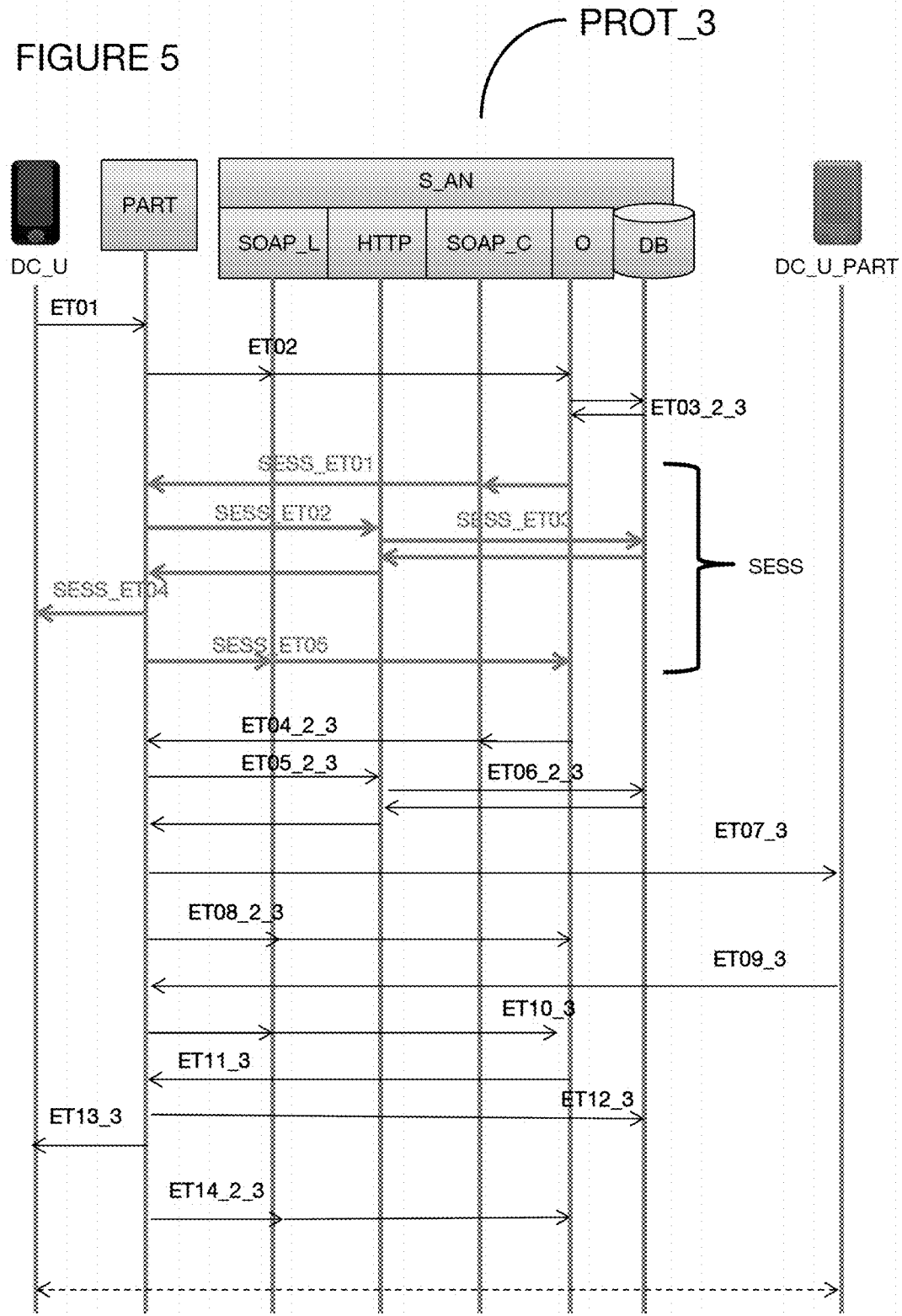
FIG. 5 illustrates by a chart the exchanges performed during step B1 of implementation of the method in case of non-establishment of a communication.

FIG. 5 illustrates by a chart the exchanges performed during step B1 of implementation of the method in case of non-establishment of a communication.

In one embodiment illustrated by the scheme PROT_3, the employee does not take the call.

Recall that steps SESS_ET01 to SESS_ET05 of the session SESS are identical to the scheme PROT_1 of FIG. 3.

The steps ET04_2_3 to ET08_2_3 are identical to the scheme PROT_2 of FIG. 4.

In a step ET09_3 the called party does not press the "*" key of the telephone, and the communication platform of the company dispatches this information item in a step ET10_3, in particular to the client application O of the server S_AN. In a step ET11_3, the establishment of a communication with a device relating to voice messaging (not illustrated) is requested of the platform of the company PART by the client application O; the former by dispatching a push notification ET12_3 notifies the server S_AN, and performs by a step ET13_3 a notification to the device DC_U of connection with the device relating to voice messaging. In a step ET14_2_3, the server S_AN receives information of this notification.

Figure 6:
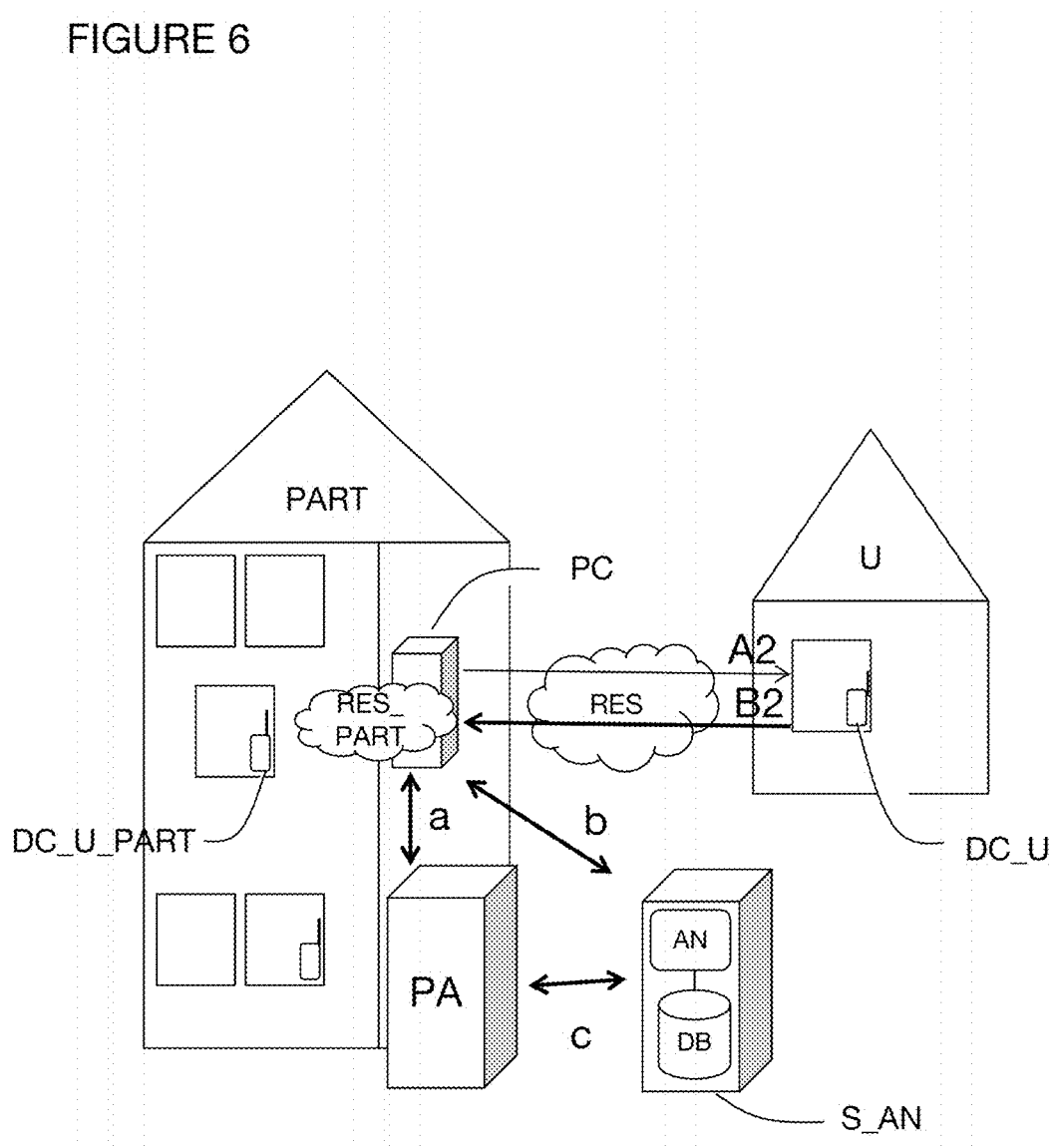
FIG. 6 illustrates a second exemplary implementation of the method here described.

The two communication devices are connected. FIG. 6 illustrates a second exemplary implementation of the method here described.

In this embodiment, an employee of the company PART calls a client U from a fixed telephone of the company, the call being performed via the anonymization platform PA (a). The parameters of the call are saved in the database DB integrated into the communications data processing server S_AN; in particular the identifier ID_DC_U_PART of the sender, the identifier ID_DC_U of the recipient, the company's generic connection identifier used, and the time of the call.

In a particular embodiment, a step of information storage is performed later once the communication has or has not been established, so as to save the information about the establishment or the non-establishment of the call (b).

In a first step denoted A2, the employee calls the client, the method implemented in the server S_AN stores the characteristics of this first call. In a second step B2, the client calls back a few minutes later, for example to request an additional particular, the method receives characteristics of this second call, searches the communications log DB, and retrieves the connection identifier of the employee ID_DC_U_PART. Step B2 is identical to step B1 of FIG. 1. Alternatively, the alias number is also stored, and then searched for.

FIG. 7 illustrates by a chart the exchanges performed during step A2 of implementation of the method.

During an outgoing call in a step ET01_4, the communication interface SOAP_L and the client application O receive the notification of this outgoing call in a step ET02_4. In a step ET03_1_4, the client application O directs the storage in the communications log of the connection identifiers of the outgoing call and of the client. Alternatively the time of the call and the alias number used are also stored.

In a step ET04_4, the platform of the company PART connects to the device DC_U, and in a step ET_05_4 notifies the device of the employee.

In a step ET06_4, the communication platform of the company dispatches to the server S_AN information about this notification. The devices DC_U_PART and DC_U are connected.

FIG. 8*a* and FIG. 8*b* illustrate an environment of implementation of the communications data processing method here presented, for example in the case of an SMS message dispatched by a client.

In the general implementation scheme of FIG. 8*a*, through a system using software referenced K, for example the Kannel software, and through the HTTP enquiries to the server S_AN, the method here described allows the assignment of communications of, and by, SMS.

The server S_AN dispatches push notifications to the mobile applications installed in the device DC_U_PART in the following cases: reception of a new SMS (stored in the database while waiting to be searched for), a missed call or a new message in the inbox.

In one embodiment described in FIG. 8*b*, at 801, the client dispatches an SMS with their device DC_U, to the company's alias number. At 802, the SMS is directed through the network RES and the client platform SMSC to a communication interface of SMS type installed in the server S_AN. At 803, this SMS interface transfers the SMS to the server S_AN by using an HTTP enquiry. At 804, the employee is retrieved through a search in the communications log, and the SMS is stored. At 805, a notification of the SMS is dispatched to DC_U_PART. At 806, the device DC_U_PART accesses the SMS by calling upon an API. At 806*b* is, if the SMS remains in the database for more than N min (N is parametrizable), it is automatically dispatched to DC_U_PART via a service XMS_PART, an XMS ("eXtended Messaging Service" in English) service allowing the exchange of SMS messages.

In the present text, the devices or modules may be implemented in software form, in which case it takes the form of a program executable by a processor, or in hardware form, such as an application specific integrated circuit (ASIC), a system on chip (SOC), or in the form of a combination of hardware elements and applications, such as for example an application program intended to be loaded and executed on a component of FPGA (Field Programmable Gate Array) type.

Although the embodiments described above are so within the non-limiting framework of communications between a company and its clients, that is to say in the B2C (from the English "Business-to-Consumer") context, the person skilled in the art will understand that the present invention is not limited to this context, which serves only as support to illustrate its implementation according to one or more embodiments, and that the present invention is also applicable and may be implemented according to various embodiments in other contexts, such as for example that of B2B (from the English "Business-to-Business"), or in a private or family context. The proposed method thus presents the advantage, in the context of family usage, in which a family composed of several members uses a unique number, for example a unique fixed number, of preventing the members of the family, in particular the children, from having to disclose their personal telephone number (typically their mobile telephone number) to people outside the family, such as, for example, craftspersons (plumbers, repairers, etc.) or other professionals (delivery persons, etc.) obliged to be in telephone contact with the family, someone from the family using the family's unique number to call them, while being able to be reached directly in case the other party should call back. Indeed, despite the person outside the family not having had knowledge of the family's unique number and not of the personal number of the person of the family who called them, the proposed method allows, when there is a callback from the outside party to the family's unique number, the call to be directed to the person of the family who made the first call to the outside party. For example, when a member of a group corresponding to a family calls a telephone number or a telephone identifier other than those of the elements of the group (in this example of the family), the outgoing call will be able to be presented to the called party with a unique number used as alias by the members of the group. The proposed method allows, when there is a callback from the other party to the unique number, the call to be directed to the member of the group who made the first outgoing call, and not to another member of the group. The person skilled in the art will furthermore understand that the present invention is not limited to this family context, which will be able to be generalized for the implementation of the present invention according to one or more embodiments to any group of users or of machines using a unique number as alias to be presented when there is a call from a person or a machine having a number other than the call numbers of the elements of the group, so as for example to allow a callback to the alias number to be directed to the number or the identifier of the person or of the machine that made the first call.

One or more exemplary embodiments of the invention affords a solution not exhibiting the drawbacks of the prior art.

Although described through a certain number of detailed exemplary embodiments, the proposed method and the object for the implementation of the method comprise diverse variants, modifications and enhancements which will be apparent in an obvious manner to the person skilled in the art, it being understood that these diverse variants, modifications and enhancements form part of the scope of the invention, such as defined by the claims which follow. Moreover, various aspects and characteristics described hereinabove may be implemented together, or separately, or else substituted for one another, and together the various combinations and sub-combinations of the aspects and characteristics form part of the scope of the invention such as defined by the claims hereinafter. Furthermore, it may be that certain devices and objects described hereinabove do not incorporate the totality of the modules and functions described for the preferred embodiments.

The invention claimed is:

1. A method of processing data of communications through a communication network, comprising the following acts performed by a server device:
receiving from the communication network first data relating to a first communication between a first and a second electronic device respectively associated with a first and a second connection identifier, the first data comprising said second connection identifier and a generic connection identifier associated with several connection identifiers including the first connection identifier, said generic connection identifier replacing the first connection identifier for the first communication,
storing in a non-transitory computer-readable medium at least the first connection identifier associated with the generic connection identifier, and the second connection identifier used for the first communication,
receiving from the communication network second data relating to a second communication,
searching through the second data for the first or the second stored connection identifier, and
according to a result of the search, associating the second communication with the first and second connection identifiers,
wherein the method furthermore comprises, for the first communication and the second communication:
if the communication is an established telephone call, storing in the non-transitory computer-readable medium, in association with the stored first connection identifier associated with the generic connection identifier, and the second connection identifier used for the communication, data relating to establishment, and
if the communication is a non-established telephone call, storing in the non-transitory computer-readable medium, in association with the stored first connection identifier associated with the generic connection iden-
tifier, and the second connection identifier used for the communication, storing data relating to non-establishment,
wherein the data relating to establishment of a call and the data relating to non-establishment of a call are used for limiting the number of non-established calls.

2. The method of processing data of communications according to claim 1, furthermore comprising dispatching the first connection identifier according to the result of the search.

3. The method of processing data of communications according to claim 1, for which the first communication is performed to the generic connection identifier.

4. The method of processing data of communications according to claim 1, furthermore comprising storing the generic connection identifier, searching for the generic connection identifier, and associating the generic connection identifier with the second communication according to the result of the search.

5. The method of processing data of communications according to claim 1, furthermore comprising storing a communication type, searching for the communication type, and associating the communication type with the second communication according to the result of the search.

6. The method of processing data of communications according to claim 1, furthermore comprising storing the second data relating to the second communication.

7. The method of processing data of communications according to claim 1, for which the first communication is performed by an anonymized sender.

8. The method of processing data of communications according to claim 1, for which the second communication is a message.

9. The method of processing data of communications according to claim 1, wherein:
the first communication is made by the second electronic device to the generic connection identifier; and
the second communication is made by the second electronic device to an alias connection identifier associated with the first connection identifier and distinct from the generic connection identifier.

10. The method of processing data of communications according to claim 1, wherein data relating to establishment of a call are used for limiting the number of established calls between the first and the second electronic device.

11. A non-transitory computer-readable data medium on which at least one series of program code instructions is stored for execution of a method of processing data of communications through a communication network when the instructions are executed by a processor of a server device, wherein the instructions configure the server device to perform acts comprising:
receiving from the communication network first data relating to a first communication between a first and a second electronic device respectively associated with a first and a second connection identifier, the first data comprising said second connection identifier and a generic connection identifier associated with several connection identifiers including the first connection identifier, said generic connection identifier replacing the first connection identifier for the first communication,
storing in a non-transitory computer-readable medium at least the first connection identifier associated with the generic connection identifier, and the second connection identifier used for the first communication, receiving from the communication network second data relating to a second communication, searching through the second data for the first or the second stored connection identifier, according to a result of the search, associating the second communication with the first and second connection identifiers, and for the first communication and the second communication:

if the communication is an established telephone call, storing in the non-transitory computer-readable medium, in association with the stored first connection identifier associated with the generic connection identifier, and the second connection identifier used for the communication, data relating to establishment, and if the communication is a non-established telephone call, storing in the non-transitory computer-readable medium, in association with the stored first connection identifier associated with the generic connection identifier, and the second connection identifier used for the communication, storing data relating to non-establishment, wherein the data relating to establishment of a call and the data relating to non-establishment of a call are used for limiting the number of non-established calls.

12. A server for processing data of communications, able to process data of communications through a communication network, the server comprising:

a processor; and a non-transitory computer-readable medium comprising instructions stored thereon, which when executed by the processor configure the server to perform acts comprising:

receiving from the communication network first data relating to a first communication between a first and a second electronic device respectively associated with a first and a second connection identifier, the first data comprising said second connection identifier and a generic connection identifier associated with several connection identifiers including the first connection identifier, said generic connection identifier replacing the first connection identifier for the first communication;

storing in a database, called a communications log, at least the first connection identifier associated with the generic connection identifier, and the second connection identifier used for the first communication;

receiving from the communication network second data relating to a second communication;

searching through the second data for the first or second connection identifier stored in the database;

according to a result of the search, associating the second communication with the first and second connection identifiers; and for the first communication and the second communication:

if the communication is an established telephone call, storing in the non-transitory computer-readable medium, in association with the stored first connection identifier associated with the generic connection identifier, and the second connection identifier used for the communication, data relating to establishment, and if the communication is a non-established telephone call, storing in the non-transitory computer-readable medium, in association with the stored first connection identifier associated with the generic connection identifier, and the second connection identifier used for the communication, storing data relating to non-establishment, wherein the data relating to establishment of a call and the data relating to non-establishment of a call are used for limiting the number of non-established calls.

* * * * *